Oct. 16, 1934.  J. W. BRUNDAGE  1,976,833
TOGGLE MOLDING PRESS
Filed Oct. 21, 1933
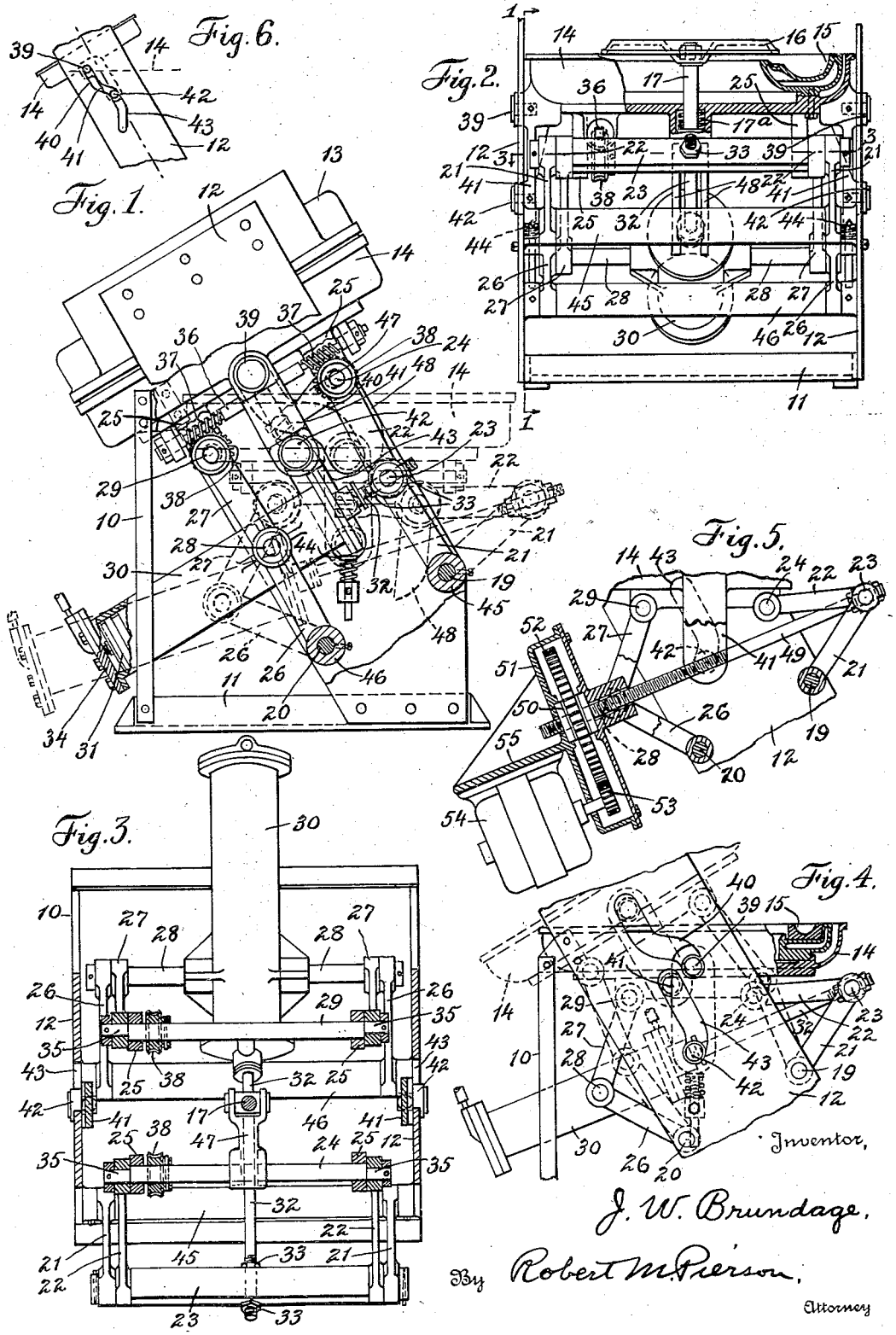
Inventor
J. W. Brundage,
By Robert M. Pierson
Attorney Patented Oct. 16, 1934

1,976,833

UNITED STATES PATENT OFFICE 1,976,833

TOGGLE MOLDING PRESS

James W. Brundage, Akron, Ohio, assignor to The Summit Mold & Machine Company, Akron, Ohio, a corporation of Ohio Application October 21, 1933, Serial No. 694,606

6 Claims. (Cl. 18—17)

This invention relates to molding presses for shaping and curing articles of rubber or other plastic material, including pneumatic tire casings and inner tubes, single-tube tires, etc.

The movable head of such a press has heretofore been given an opening movement at first rectilinear and then forwardly tilting, by mounting it on the plunger of a fluid-pressure ram having a pivoted cylinder, and controlling the head with a cam guide, as in my Patent No. 1,895,603 of Jan. 31, 1933. The ram cylinder in such an arrangement requires a large volume of water, under a heavy final pressure where there is a counter pressure in the mold, and it is difficult to operate simultaneously such a press and others on the same hydraulic line. A toggle and power-ram operating means for imparting similar movements to the movable head is disclosed in my prior application Ser. No. 622,402, filed July 14, 1932, in connection with the rods slidable on a rock-frame for guiding said movable head.

The present invention has for its principal object to accomplish the same movements without the use of said guide rods and rock-frame, by means of an improved combination of toggle devices, power ram and guiding means, so that a smaller ram with a longer movement may be employed, the apparatus is simplified and the same type of press may be economically used for both heavy and comparatively light molding operations. Incidental improvements relate to the adjustment of the movable head with reference to its operating means, to allow for wear in the latter in certain instances, to the arrangement of the toggles in some cases for locking the head in closed position, and to a special work-stripper operating means when the press is employed for molding tire casings for example.

Of the accompanying drawing, Fig. 1 is a side elevation of the improved press, adapted for molding pneumatic tire casings for example, partly broken away and in section, the section being mainly on the line 1—1 of Fig. 2, except that the full-line position of the movable parts shows the press in its closed position.

Fig. 2 is a front elevation of the lower part of the press in open position, partly in section.

Fig. 3 is a horizontal section on the line 3—3 of Fig. 2.

Fig. 4 is a partial side elevation, partly broken away and in section, of a slightly modified type of the same press adapted for a lighter duty such as molding bicycle tires, and omitting some of the parts of the heavier press.

Fig. 5 is a side elevation, partly in vertical section, showing a toggle-operating electric motor and screw ram substituted for the fluid-pressure ram of the earlier views.

Fig. 6 is a fragmental side elevation on a smaller scale, illustrating a modified cam-slot and stud arrangement.

While either or both press heads in this class of apparatus may be movably mounted, it is preferred herein to make the lower head movable and fixedly mount the upper one. The drawing shows such an arrangement, wherein 10 is a frame having a base 11 and uprights including a pair of side plates 12, between whose upper ends is mounted a fixed upper press head 13 in an inclined position to expose its under side for easy cleaning from the front of the press at the right.

14 is the movably mounted lower press head. The two heads carry complemental steam-jacketed mold sections of which one is shown at 15 in Fig. 2, adapted in this case for molding and vulcanizing a pneumatic tire casing containing the usual internal pressure bag or inflatable core. When the press is opened, the molded article generally stays in the lower mold section, and said lower section is here shown with the usual bead ring 16 forming a part thereof and relatively movable, by retraction of said lower section, out of its normal position in the latter to strip the tire from the rest of the lower mold section. In this case, said ring is formed on a plate provided with a central stem 17 slidable in a guide 18 on the lower head and adapted to be operated by means hereinafter described.

The lower head 14 is carried by the upper ends of oppositely-bending front and rear toggle units whose lower or outer ends are pivoted on fixed, transverse, horizontal rods 19, 20 mounted in the side plates 12 near the lower ends of the latter and in a common plane parallel with the dividing plane of the mold. Each toggle unit consists of two sets or pairs of links, the front unit comprising lower links 21 pivoted at their lower ends on the rod 19, and upper links 22 pivotally connected at their lower ends by a knuckle rod 23 with the upper ends of the links 21, and pivotally connected at their upper ends by a rod 24 with the under side of the movable head 14 through ears 25 carried by said head. Similarly, the rear toggle unit comprises lower links 26 pivoted on the rod 20 and upper links 27 pivoted to the lower links by aligned knuckle trunnions 28 and connected with the head 14 by a pivot rod 29 carried by ears on said head.

For actuating the toggles there is provided a floating power ram consisting in this case of a double-acting, fluid-pressure cylinder 30, provided between its ends with the oppositely-projecting trunnions 28 whereby said cylinder is pivotally supported by the knuckle of the rear toggle unit, together with a piston or plunger 31 in said cylinder, having a rod 32 projecting through a stuffing-box in the front head of the cylinder and attached by a pair of nuts 33 to the squared intermediate portion of the knuckle rod 23 of the front toggle unit.

The press-closing movement of the ram is imparted by admitting hydraulic or other fluid pressure to the front end of the cylinder 30 and simultaneously discharging its rear end, to move the toggle units toward their straightened position and raise the lower head 14. The two heads may meet before the toggles are completely straightened, but where there is a heavy counter pressure within the mold, as in vulcanizing a pneumatic tire casing, it is preferred to move the toggles slightly over center to beyond their straightened position as shown in Fig. 1 in order to lock the press against any possibility of opening the mold by the pressure within it in case the ram pressure should accidentally fail or fall too low. In that case the operating mechanism requires a stop which is furnished by the abutting of the piston or inner end of the piston rod 32 against the rear cylinder head 34, and the amount of overstraightening of the toggles before this stop is reached may be regulated by adjusting the nuts 33 on the front end of the piston rod against the knuckle rod 23.

For adjusting the position of the head 14 with reference to the upper front and rear toggle links 22 and 27, concurrently on both sides of the press, when used for heavy-duty molding, in order to allow for wear in the toggle joints, the upper pivot rods 24 and 29 are provided with eccentric journal end portions 35, on which the upper ends of said links have a bearing, these eccentric journals being oppositely offset on the two rods; and the rods are concurrently rotated in opposite directions, to perform the adjustment, by means of a screw shaft 36 having oppositely-pitched worms 37 engaging worm gears 38 on the respective pivot rods 24 and 29, the screw shaft being carried in bearing ears on the lower side of the head 14 and having a squared front end for the application of a turning wrench.

The toggles are folded or relaxed to lower the head 14 and open the press, by admitting fluid pressure to the rear end of the ram cylinder 30 and simultaneously discharging its front end. To guide said head so that the first part of its opening movement, or reversely the last part of its closing movement, will be rectilinear, with the plane of the movable head maintained parallel with that of the fixed head, and so that, during a subsequent portion of the opening movement or an anterior portion of the closing movement said movable head will be swung or tilted at an angle to the plane of the fixed head, toward or from the unloading and loading position of the lower head shown in Fig. 2 and in broken lines in Fig. 1, the head 14 is provided on both sides with roller studs 39 which run in a pair of cam slots 40 formed in the respective frame side plates 12, one of said slots being shown in the background in Fig. 1, and one shown in the foreground in the modification, Fig. 4, hereinafter referred to.

The two end portions of each slot are offset and perpendicular to the meeting plane of the heads, and are connected by a slanting portion which imparts a forward swinging movement to the descending head 14.

The movable head requires additional guiding which, in the present case where, for greatest simplicity, the toggles are stationarily pivoted at their lower ends as described, is most conveniently provided by also guiding said lower head in the direction of motion further down on the side plates 12. Hence the integral head lugs 41 upon whose upper portions the roller studs 39 are mounted are extended downwardly to support a second pair of roller studs 42 which run in guide slots 43 (also seen in modified shape in Fig. 4) formed in the respective frame plates 12 in line with the upper portions of the slots 40, said slots 43 in Fig. 1 being straight throughout their length and perpendicular to the meeting plane of the heads. The lower ends of the slots 40 and 43 lie vertically in line when the lower head is to stand substantially horizontal in its most open position as indicated in broken lines in Fig. 1. The broken-line positions of the toggles in the open position indicate that the front toggle formed by the links 21 and 22 has undergone a greater folding or bending movement than the rear toggle formed by the links 26 and 27 in order to permit the swinging movement of the lower press head. For cushioning the head 14 at the lower limit of its opening movement there are mounted in guide blocks on the frame plates 12 a pair of spring-supported bumper pins 44 having heads encountered by the lower ends of the lugs 41 at completion of the opening movement.

It is preferred to surround the lower pivot rods 19 and 20 with sleeves 45, 46 which act as spacers for the toggle links 21 and 26 and also serve to stiffen said rods against the bending strains. For arresting the bead ring 16 at the lower limit of opening movement while the lower mold section 15 continues to descend and strip the tire casing from said mold section, the stem 17 of said ring is controlled by one arm 47 of a lever pivoted upon the forward upper toggle pivot rod 24, said lever having another arm 48 which is forked or bifurcated to straddle the piston rod 32 and provided with a slanting lower end which encounters the sleeve 45 as said lever arm is brought downwardly and forwardly by the movement of the head 14, thereby accomplishing the stripping action. As the closing movement begins, the ring 16 is returned to its seat on the body of the mold section by a spring 17ª surrounding its stem.

In the modification shown in Fig. 4, representing portions of the same type of press adapted for lighter duty such as the molding and vulcanizing of bicycle tires, inner tubes for pneumatic tires, etc., the stripper as well as the adjustments at the upper ends of the toggle units have been omitted. The head 14 in such a case may have a shorter movement and the lower end of the guide slot 43 on each side may have a substantially vertical portion, inclined to the remainder of the slot, to bring the lower studs 42 vertically in line with the upper studs 39 in the open position, the cam slot 40 being of the same shape as before but relatively shorter. In this case, locking of the press against the moderate internal mold pressures employed for inflating a single-tube tire or an inner tube during vulcanization is generally not required and the toggles, as shown in broken lines, need not quite reach their straightened positions when the press is fully closed.

In either of the described embodiments, for the use of factories having no hydraulic or compressed air at a sufficient pressure but where electric current is available, the screw-and-nut ram illustrated in Fig. 5 may be substituted for the fluid-pressure ram. In this case the piston rod is replaced by a screw rod 49 having its front end connected with the knuckle rod 23 of the front toggle unit and its threaded rear portion engaged with a nut 50 adapted to turn thereon and held against axial movement in a casing 51 having a forward boss formed with trunnion pins 28 constituting the knuckle connection of the rear toggle-unit links. The nut 50 is carried in the hub of a large gear 52 meshing with a smaller gear pinion 53 on the shaft of an electric motor 54 mounted on a bracket 55 of the casing 51. According to the direction of turning of the motor shaft, the nut 50 is screwed in or out on the rod 49 and the head 14 is correspondingly raised or lowered.

Fig. 6 illustrates a modification wherein the upper and lower cam slots 40 and 43 are merged or continuous with each other at their adjacent ends, and the upper stud 39 is laterally offset on the movable head 14, from the plane of the central axis of said head which passes through the lower stud 42, the upper slot portion 40 being correspondingly offset from the lower slot portion 43. This arrangement promotes the attainment of a longer rectilinear movement of the head 14 in the upper part of its stroke to avoid pinching of the beads of tire casings of large cross-section which otherwise might occur in closing the press. The cams and studs are duplicated on the other side.

Various other changes of embodiment could be made without departing from the scope of this invention.

I claim:

1. A molding press comprising a pair of press heads of which one is movable toward and from the other, fixed guiding means for the movable head including a cam guide and another guide spaced therefrom in the direction of movement for maintaining the movable head parallel with the other head during the first part of its opening movement and tilting it relative thereto during the latter part of said movement, toggle means for moving the movable head, and power means for actuating the toggle means.

2. A molding press according to claim 1 in which there are two oppositely-bending toggle units each stationarily pivoted at one end and connected at the other end with the movable head, and a floating power ram carried by said toggle units.

3. A molding press comprising a frame including side plates carrying a fixed press head and each formed with a cam guide slot and another guide slot, a movable press head having on each side a pair of studs in the respective guide slots for imposing reciprocating and tilting movements of said movable head relative to the fixed head, toggle means stationarily pivoted on the frame at one end and having the other end connected with the movable head for operating the latter, said means including a rear toggle unit and an oppositely-folding front toggle unit having a greater bending movement than the rear unit, permitting the tilting of the lower head, and a floating power ram carrier by said toggle units for actuating the latter.

4. A molding press comprising a frame including side plates each formed with a cam guide slot and another guide slot continuous with the first one, studs in said slots, a movable press head carrying said studs and guided by the slots in successive rectilinear and swinging opening movements, and means for actuating said movable head.

5. A molding press comprising a pair of heads one of which is movable toward and from the other, means for guiding the movable head, two oppositely-bending toggle units for operating the movable head, movable to slightly beyond their straightened position to lock said movable head in its closed position, an eccentric adjustment at one end of each unit for varying the closed position of the fixed head, means for concurrently operating the two adjustments and a floating fluid-pressure ram carried by said toggle units for actuating the latter.

6. A tire-molding press comprising a pair of press heads carrying respective mold members, one head being movable and guided for reciprocating and tilting movements relative to the other, the movable head having a stripper ring in its mold member, provided with a stem centrally guided on the head, toggle means having an outer pivot structure for operating the movable head, and a lever pivoted on the movable head and having an arm connected with the stripper stem and another arm for encountering said toggle pivot structure during the opening movement of said movable head for projecting the stripper ring.

JAMES W. BRUNDAGE.